(12) United States Patent
Qiang et al.

(10) Patent No.: US 9,363,659 B2
(45) Date of Patent: Jun. 7, 2016

(54) HOME BASE STATION LOCATION INFORMATION

(71) Applicant: TELEFONAKTIEBOLAGET L M ERICSSON (PUBL), Stockholm (SE)

(72) Inventors: Zu Qiang, Kirkland (CA); Yong Yang, Kållered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/400,431

(22) PCT Filed: May 7, 2013

(86) PCT No.: PCT/EP2013/059485
§ 371 (c)(1),
(2) Date: Nov. 11, 2014

(87) PCT Pub. No.: WO2013/167589
PCT Pub. Date: Nov. 14, 2013

(65) Prior Publication Data
US 2015/0140965 A1 May 21, 2015

Related U.S. Application Data

(60) Provisional application No. 61/645,647, filed on May 11, 2012.

(51) Int. Cl.
*H04M 1/68* (2006.01)
*H04W 8/02* (2009.01)
(Continued)

(52) U.S. Cl.
CPC ............ *H04W 8/02* (2013.01); *H04L 12/1407* (2013.01); *H04L 61/203* (2013.01);
(Continued)

(58) Field of Classification Search
CPC ....................................................... H04W 8/02
See application file for complete search history.

(56) References Cited

U.S. PATENT DOCUMENTS

| 2008/0076425 | A1* | 3/2008 | Khetawat | H04W 88/12 455/436 |
| 2012/0246325 | A1* | 9/2012 | Pancorbo Marcos | H04L 12/2602 709/227 |
| 2014/0357232 | A1* | 12/2014 | Thakur | H04M 15/61 455/411 |

OTHER PUBLICATIONS

Alcatel-Lucent "DISC on H(e)NB Identity verification & BBAI Tunnel Information propagation" 3GPP TSG CT WG4 Meeting #56, C4-120230, 2012, 4 pages.
3GPP, 3rd Generation Partnership Project; Technical Specification Group Services and System Aspects; 3GPP system—fixed broadband access network interworking; Stage 2 (Release 11), 3GPP TS 23.139, V11.0.0, 2012, 87 pages.

(Continued)

*Primary Examiner* — Tammy Pham
*Assistant Examiner* — Idowu O Osifade
(74) *Attorney, Agent, or Firm* — Rothwell, Figg, Ernst & Manbeck, P.C.

(57) ABSTRACT

The embodiments herein relate to a method in a location information node (327) for providing location information associated with a home base station (345) to a PCRF (350). The node (327) is dedicated to handling the location information. When the home base station (345) sets up an IPSec tunnel with a SeGW (332), the node (327) receives the information from the AAA server (330). The node (327) transmits the information to the PCRF (350) via the MME/SGSN (325, 340) using an interface between the MME/SGSN (325, 340) and the PCRF (350), or to the PCRF (350) via the MME/SGSN (325, 340) and a SGW/PGW (343, 348) using a S11/S4 interface, a S5/S8 interface and a Gx/Gxx interface, or directly to the PCRF (350) using an interface between the node (327) and the PCRF (350).

18 Claims, 10 Drawing Sheets

(51) Int. Cl.
*H04L 12/14* (2006.01)
*H04M 15/00* (2006.01)
*H04W 4/24* (2009.01)
*H04W 8/26* (2009.01)
*H04W 12/08* (2009.01)
*H04L 29/12* (2006.01)
*H04W 88/00* (2009.01)

(52) U.S. Cl.
CPC .......... *H04L 61/2514* (2013.01); *H04M 15/66* (2013.01); *H04M 15/8038* (2013.01); *H04W 4/24* (2013.01); *H04W 8/26* (2013.01); *H04W 12/08* (2013.01); *H04L 61/2592* (2013.01); *H04W 88/005* (2013.01)

(56) References Cited

OTHER PUBLICATIONS

3GPP, 3rd Generation Partnership Project; Technical Specification Group Services and System Aspects; Security of Home Node B (HNB) / Home evolved Node B (HeNB) (Release 11), 3GPP TS 33.320, V11.4.0, 2011, 41 pages.

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 10), 3GPP TS 23.401, V10.5.0, 2011, 282 pages.

\* cited by examiner

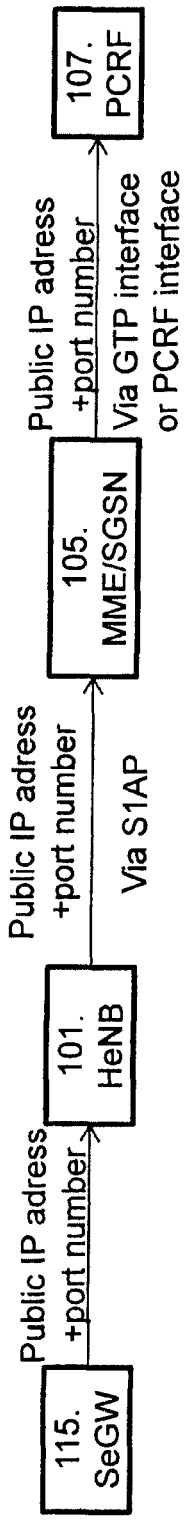
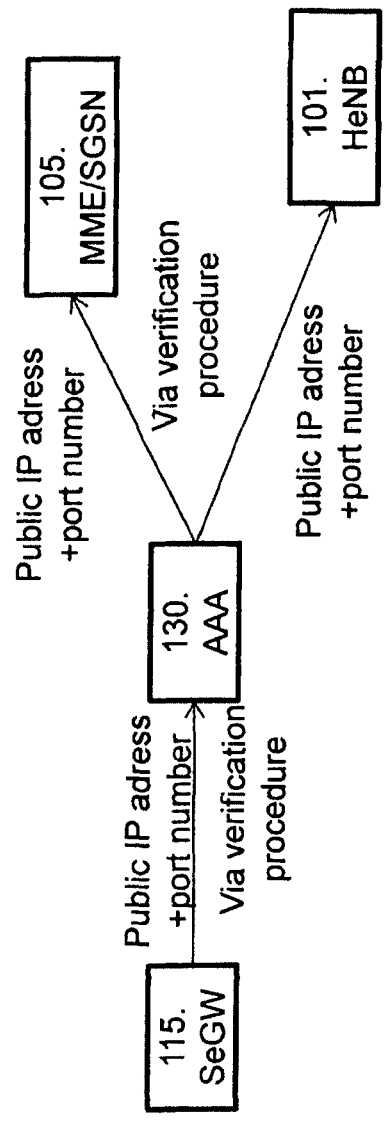
Fig.2a: Alternative A
Fig.2b: Alternative B

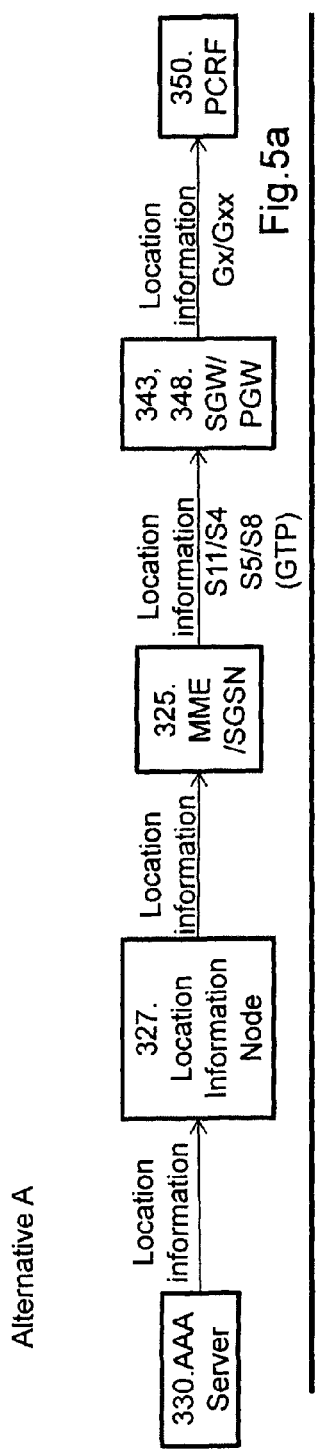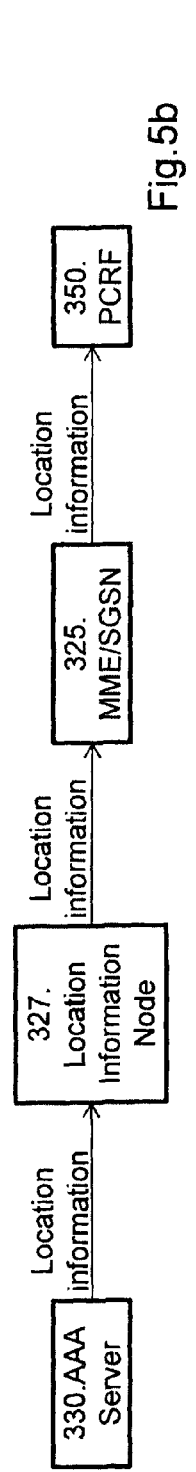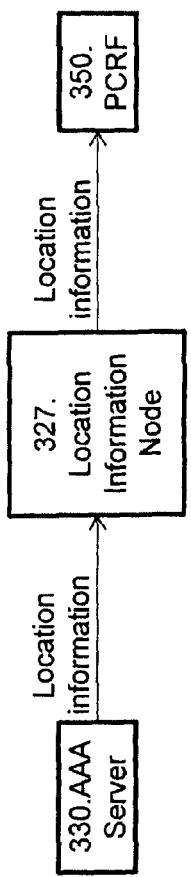

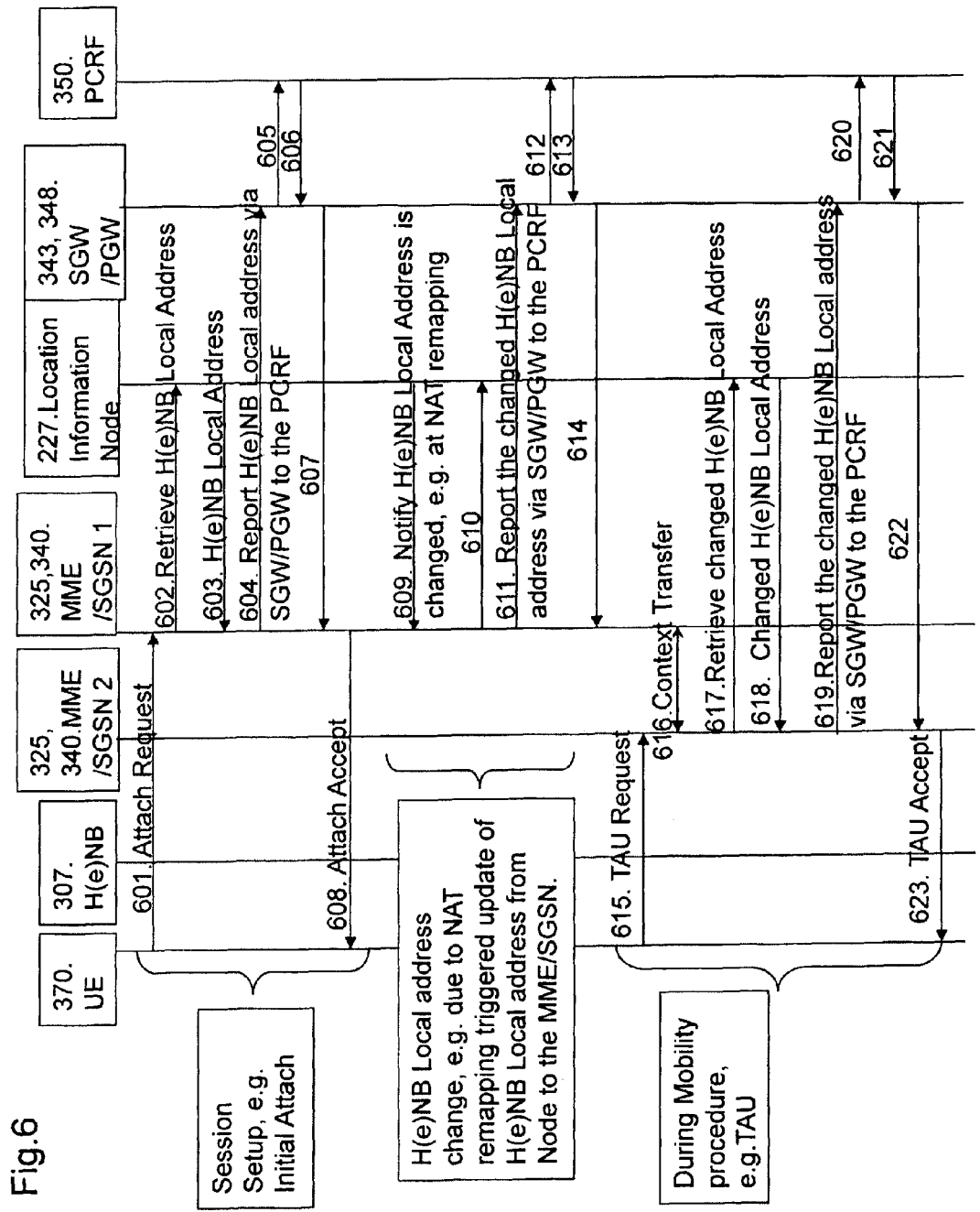

HOME BASE STATION LOCATION INFORMATION

CROSS REFERENCE TO RELATED APPLICATION(S)

This application is a 35 U.S.C. §371 National Phase Entry Application from PCT/EP2013/059485, filed May 7, 2013, designating the United States, and also claims the benefit of U.S. Provisional Application No. 61/645,647, filed May 11, 2012. The disclosures of both applications are incorporated herein in their entirety by reference.

TECHNICAL FIELD

Embodiments herein relate generally to a location information node and a method in the location information node. More particularly the embodiments herein relate to providing location information associated with a home base station to a Policy and Charging Rules Function (PCRF).

BACKGROUND

In a typical cellular network, also referred to as a wireless communication system, User Equipment's (UEs), communicate via a Radio Access Network (RAN) to one or more Core Networks (CNs).

A user equipment is a device which may access services offered by an operator's core network and services outside the operator's network to which the operator's radio access network and core network provide access. The user equipment's may be for example communication devices such as mobile telephones, cellular telephones, smart phones, tablet computers or laptops with wireless capability. The user equipment's may be portable, pocket-storable, hand-held, computer-comprised, or vehicle-mounted mobile devices, enabled to communicate voice and/or data, via the radio access network, with another entity, such as another mobile station or a server. The user equipment will be referred to as UE in some of the figures.

User equipment's are enabled to communicate wirelessly in the cellular network. The communication may be performed e.g. between two user equipment's, between a user equipment and a regular telephone and/or between the user equipment and a server via the radio access network and possibly one or more core networks, comprised within the cellular network.

The radio access network covers a geographical area which is divided into cell areas, with each cell area being served by a base station. The base station is also called Radio Base Station (RBS), evolved NodeB (eNB), NodeB, B node or base station in some radio access networks. A user equipment may be present in the cell and served by the base station. A cell is a geographical area where radio coverage is provided by the radio base station at a base station site. Each cell is identified by an identity within the local radio area, which is broadcast in the cell. The base stations communicate over the air interface operating on radio frequencies with the user equipment's within range of the base stations. The cell may have different size and coverage and some types of cells are femtocells, picocells, metrocells and microcells—broadly increasing in size from femtocells (the smallest) to microcells (the largest). A femtocell is a small cellular base station, typically designed for use in a home or small business which provides improved cellular coverage, capacity and applications. Using third Generation Partnership Project (3GPP) terminology, a Home eNodeB (HeNB) is a Long Term Evolution (LTE) femtocell and a Home Node B (HNB) is a Third Generation (3G) femto cell. In the following, even though the term HeNB is used, the description is equally applicable to a HNB.

The 3GPP and the BroadBand Forum (BBF) are the standardization organizations for mobile and fixed networks respectively. There is an ongoing joint work item on Fixed Mobile Convergence (FMC) between these two organizations. FMC is a change in telecommunications that finally will remove the differences between fixed and mobile networks, creating seamless services using a combination of fixed broadband and local access wireless technologies to meet the customer's needs. The goal of FMC is to optimize transmission of all data, voice and video communications to and among end users, no matter what their locations or devices, i.e. a single device may connect through and be switched between wired and wireless networks. Femtocells are one alternative way to deliver the benefits of FMC.

With the femto case, the HeNB may be located behind a Network Address Translator (NAT). In this case, in order to provide Quality of Service (QoS) on the femto traffic, the NAT public Internet Protocol version 4 (IPv4) address and source User Datagram Protocol (UDP) port number shall be provided to the PCRF. NAT can be described as a process of modifying IP address information in IPv4 headers while in transit across a traffic routing device. NAT allows an IP network to maintain public IP addresses separately from private IP addresses. The PCRF is the node in a network which is responsible for the policy rules in the network.

An IP address may be public or private. A public IP address is a globally unique number that identifies a device on the Internet. A private IP address is typically assigned to devices on a Local Area Network (LAN) and is not used outside the LAN. A private IP address is typically used with a router. When using NAT, it is possible to have private IP addresses on the local network and to use a single public IP address to be used by the devices on the local network when they access the internet. The UDP is a protocol which enables applications to send messages, i.e. datagrams, to other hosts on an IP network without the need to setup a special transmission channels first. The UDP comprises a source port number, a destination port number, a length and a checksum. The source UDP port number identifies the sender's port and should be assumed to be the port to reply to if needed. The destination port number identifies the receiver's port.

FIG. 1 below shows a typical example of a network 100 where a HeNB 101 is behind a NAT while connected to 3GPP EPC 103, where EPC is short for Evolved Packet Core. In FIG. 1, a user equipment 104 is served by the HeNB 101. The HeNB 101 is connected to a Mobility Management Entity/Serving General packet radio service Support Node (MME/SGSN) 105 which is a control node that works simultaneously with the radio access network and the core network with different interfaces. The interface between the MME 105 and the HeNB 101 is called S1-MME and is responsible for UE management with various different types of control messages. The MME 105 is connected to the PCRF 107. The PCRF 107 is connected to a Broadband Policy and Charging Function (BPCF) 110. The BPCF 110 is connected to a Broadband Remote Access Server (BRAS) 113 which routes traffic to and from broadband remote access devices. The HeNB 101 is connected to a Security GateWay (SeGW) 115 which provides a secure communication link between the HeNB 101 and the core network. The SeGW 115 is connected to the Packet Data Network GateWay (PGW) 117. The Home Subscriber Server (HSS) 120, connected to the MME 105, is a repository for subscriber profiles, device profiles, and state information. Even though FIG. 1 illustrates a HeNB, which is the LTE femto cell, the skilled person will understand that the architecture may also be applied for a 3G network, where the HeNB is replaced with a HNB.

In an alternative A, seen in FIG. 2a, the SeGW 115 may send the H(e)NB address information, i.e. H(e)NB public IP address and port number, to the H(e)NB 101. Then the H(e) NB 101 may forward the information using S1 Application Protocol (S1AP) signaling to the MME/SGSN 105. S1AP is a protocol which provides signaling service between the Evolved Universal Terrestrial Radio Access Network (E-UT-RAN) and the EPC. The MME/SGSN 105 then forwards the H(e)NB address information to the PCRF 107 via either the GPRS Tunneling Protocol (GTP) interface or the PCRF interface. GPRS is short for General packet radio service. A security issue has been identified regarding this alternative A. Passing the H(e)NB IP address info over the S1AP may trigger a security problem relating to that the home base station may send incorrect information.

In an alternative B, seen in FIG. 2b, the SeGW 115 may send the H(e)NB public IP address and the UDP port number to the 3GPP Authentication, Authorization and Accounting (AAA) server at an H(e)NB verification procedure. An AAA server enables control over which users are allowed access to which services, and the amount of resources they have used. Then the H(e)NB or the MME/SGSN 105 may receive the address info from the AAA server at an H(e)NB verification procedure. At least two problems have been identified with alternative B. One is that when the H(e)NB GW is used, the MME/SGSN 105 is not involved in the H(e)NB verification procedure. As the interface between the H(e)NB GW and the MME/SGSN 105 is S1AP, there is no way for the H(e)NB GW to send the H(e)NB local address info to the MME/SGSN 105 without impacts on the S1AP protocol. The second problem is that NAT remapping may be triggered at any time after the S1 session is setup. After NAT remapping, the H(e)NB 101 may be assigned with a new local IP address and/or a new UDP port number. The SeGW 115 will be informed of this change by an Internet Key Exchange version 2 (IKEv2) procedure. IKEv2 is used to set up a security association in the IPsec protocol suite. However, the MME 105 does not know that the HeNB IP address has been updated.

SUMMARY

An objective of embodiments herein is therefore to obviate at least one of the above problems and to provide improved communication handling in a communications network.

According to a first aspect, the object is achieved by a method in a location information node for providing location information associated with a home base station to a PCRF. The location information node is dedicated to handling the location information. The location information node is connected to an AAA server and a MME/SGSN. When the home base station sets up an IPSec tunnel with a SeGW, the location information node receives the location information from the AAA server. The location information comprises at least one of a local IP address, and a port number associated with an identity of the home base station. The location information node transmits the location information to the PCRF via the MME/SGSN using an interface between the MME/SGSN and the PCRF, or to the PCRF via the MME/SGSN and a SGW/PGW using a S11/S4 interface, a S5/S8 interface and a Gx/Gxx interface, or directly to the PCRF using an interface between the location information node and the PCRF.

According to a second aspect, the object is achieved by a location information node for providing location information associated with a home base station to a PCRF. The location information node is adapted to be dedicated to handling the location information. The location information node is adapted to be connected to an AAA server and a MME/SGSN. The location information node comprises a receiver which is configured to receive, from the AAA server, the location information associated with the home base station when the home base station sets up an IPSec tunnel with a SeGW. The location information comprises at least one of a local IP address and a port number associated with an identity of the home base station. The location information node comprises a transmitter which is configured to transmit the received location information to the PCRF via the MME/SGSN using an interface between the MME/SGSN and the PCRF, or to the PCRF via the MME/SGSN and a SGW/PGW using a S11/S4 interface, a S5/S8 interface and a Gx/Gxx interface, or directly to the PCRF using an interface between the location information node and the PCRF.

Since the location information node comprises the home base station location information, e.g. an H(e) NB local IP address/Port number, it may be transmitted to the PCRF. The location information node may be a standalone node or co-located with or at least a part of an existing communications node, such as a HSS, an AAA server or the PCRF.

Embodiments herein afford many advantages, of which a non-exhaustive list of examples follows:

The embodiments herein make it possible to enforce Policy and Charging Control (PCC) when the home base station is connected via a broadband network, and then dynamically updating the PCC at NAT remapping.

The embodiments herein also provide an advantage of avoiding impacts on the S1AP protocol.

The embodiments herein provides an advantage of being a secure solution compared to prior art since S1AP is not used. When the S1AP is not used, there is no security issue.

The embodiments herein provide better service to user equipment's.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 2a-b are schematic block diagrams illustrating prior art embodiments of location information handling.

FIG. 5a-c are schematic block diagrams illustrating embodiments a method.

FIG. 6 is a signalling diagram illustrating an embodiment, alternative A, using S11/S4, S5/S8 and Gx/Gxx.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relates to reporting of home base station location information, e.g. the local IP address of Home eNB or HNB, to the PCRF when a user equipment attaches to a communications network via a home base station. The PCRF needs to know the home base station location information in order to find the policies to apply. The embodiments herein propose several alternatives to forward the H(e)NB local IP address/Port number to the PCRF. A new logical location information node comprising the location information e.g. H(e)NB local IP address and port number is proposed be created in the architecture. The new logical location information node may be co-located with or is at least a part of any existing 3GPP entities, e.g. HSS, or 3GPP AAA server, SeGW or PCRF. Depending on the actual deployment (if it is co-located or not), the signalling messages to and from the location information node may vary. In the following text, a separate logical entity is assumed and the signaling message in the diagram is just an example.

Figure 1:
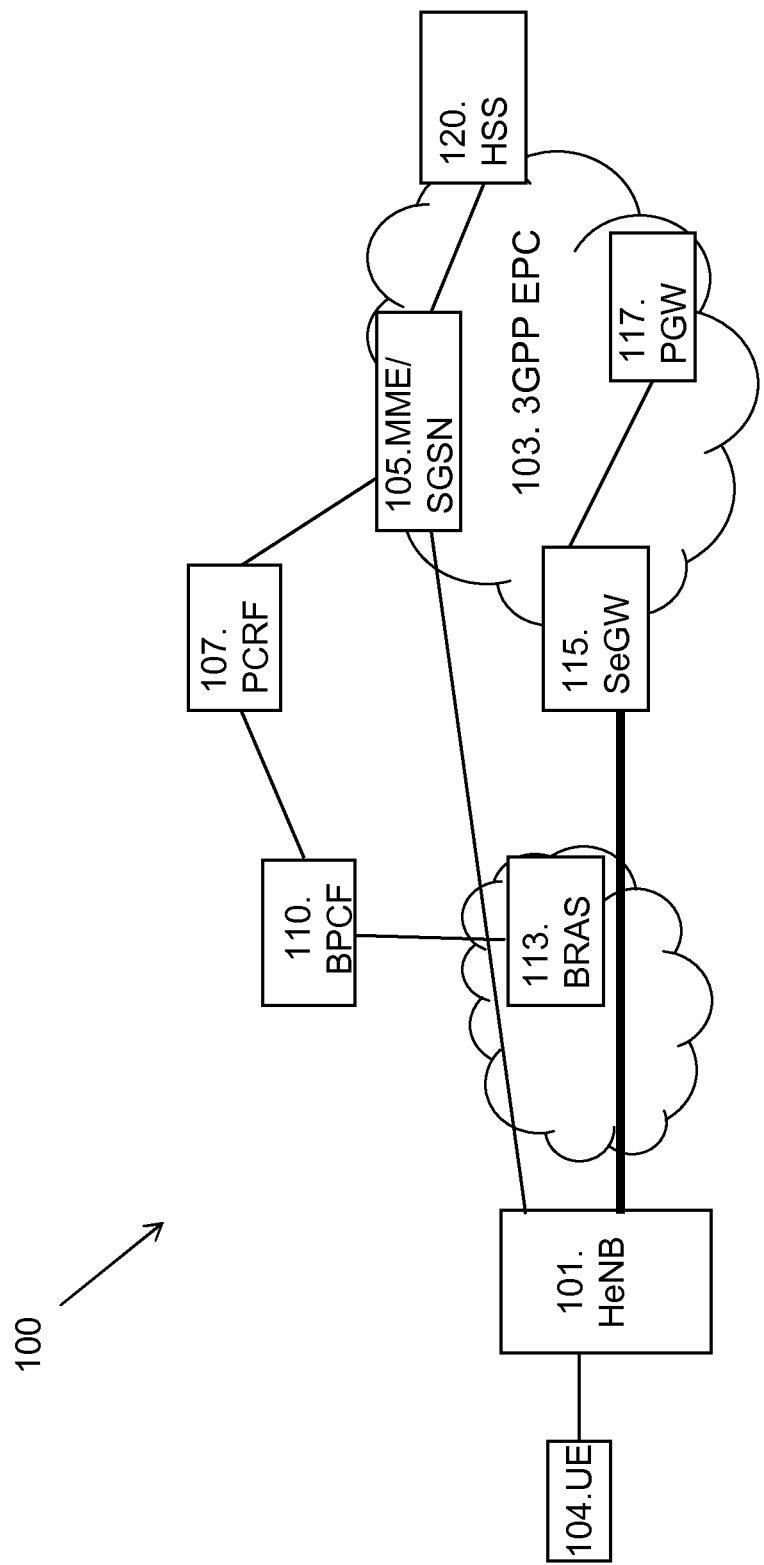
FIG. 1 is a schematic block diagram illustrating a NATed HeNB connected to the 3GPP Evolved Packet Core via a SeGW.
Figure 3:
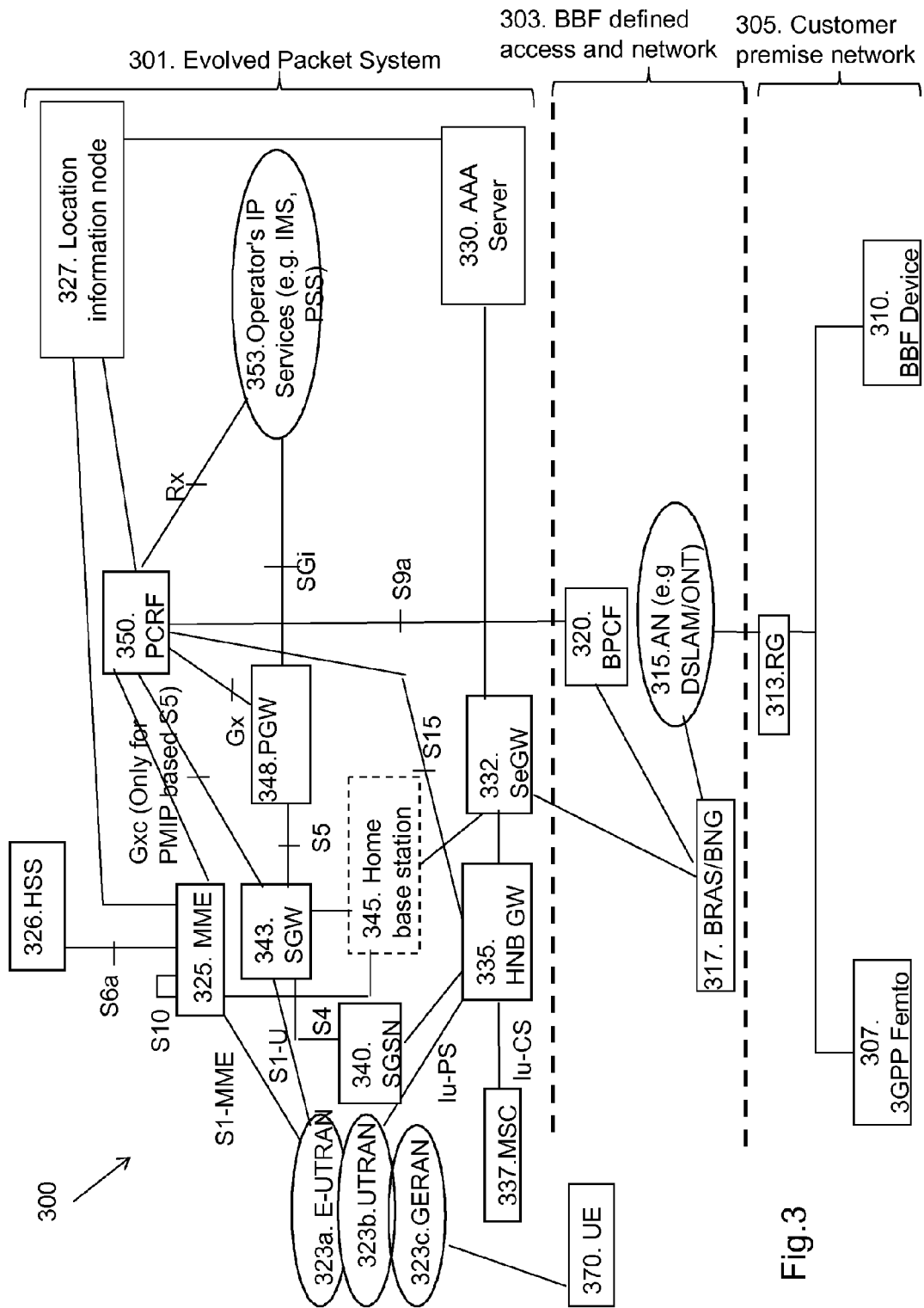
FIG. 3 is a schematic block diagram illustrating embodiments of a communications network.

FIG. 3 depicts a communications network 300 in which embodiments herein may be implemented. The communications network 300 may in some embodiments apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology or any other radio access technologies such as e.g. WLAN.

The communications network 300 is divided in three parts, the Evolved Packet System (EPS) 301, the BBF defined access and network 303 and the customers premise network 305. Dotted lines are used in FIG. 3 to illustrate the division between the three parts.

The customers premise network 305 comprises a 3GPP femto 307, which is a home base station such as a HNB. If the network 300 is an LTE network, the home base station would be H(e)NB. The 3GPP femto 307 serves at least one User Equipment (UE) 370. The user equipment may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. The user equipment is referred to as UE in some of the figures. The customers premise network 305 further comprises a BBF device 310. The 3GPP femto 307 and the BBF device 310 are both connected to a Residential Gateway (RG) 313.

The BBF defined access and network 303 comprises an Access Node (AN) 315, which may be for example a Digital Subscriber Line Access Multiplexer (DSLAM) or an Optical Network Termination (ONT). The DSLAM connects multiple customer digital subscriber line interfaces to a high-speed digital communications channel using multiplexing techniques. The BBF defined access and network 303 further comprises a BRAS/BNG 317, where BRAS is short for Broadband Remote Access Server and BNG is short for Broadband Network Gateway. The BBF defined access and network 303 also comprises a Broadband Policy and Charging Function (BPCF) 320, The Evolved Packet System 301 comprises E-UTRAN 223a, UTRAN 223b, GERAN 323c. The reference number 323 is used to refer to any of the E-UTRAN, UTRAN and GERAN. E-UTRAN is short for evolved Universal Terrestrial Radio Access Network, UTRAN is short for Universal Terrestrial Radio Access Network and GERAN is short for GSM EDGE Radio Access Network. The E-UTRAN, UTRAN, GERAN 323 is connected to a MME 325 via a S1-MME interface. The MME 325 is connected to a HSS 326 via an S6a interface. The S10 interface illustrated at the MME 325 is an interface between a plurality of MMEs 325.

The MME 325 is connected to a location information node 327, which also may also be described as a home base station location database, a control node for controlling, handling or managing location information H(e)NB location database or a HNB location database. The location information node 327 may be a standalone logical entity in the EPC architecture or it may be a node co-located in an existing node in the network 300 or it may be at least be a part of an existing node in the network 300.

The location information node 327 is connected to an AAA server 330. The AAA server 330 is connected to a SeGW 332 which is connected to the BRAS/BNG 317 in the BBF defined access and network 303. The SeGW 332 is connected to a HNB GW 335, and the HNB GW 335 is connected to a Mobile Switching Center (MSC) 337 via an Iu-CS interface. The HNB GW 335 is connected to the E-UTRAN, UTRAN, GERAN 323 via the Iu-PS interface. The HNB GW 335 is connected to the SGSN 340, and the SGSN 340 is connected, via the S4 interface, to the Serving Gateway (SGW) 343. The SGW 343 is connected to to the E-UTRAN, UTRAN, GERAN 323 via a S1-U interface.

A home base station 345, e.g. a HeNB GW or an H(e)NB, is located between the MME 325 and the SeGW 332. The SGW 343 is connected, via a S5 interface, to a PDN Gateway 348, and the PDN Gateway 348 is connected, via a Gx interface to the PCRF 350. The Gxc interface is between the PCRF 350 and the SGW 343 only for Proxy Mobile IP (PMIP) based S5 interfaces. S9a is the interface between the PCRF 350 and the BPCF 320 in the BBF defined access and network 303. S15 is the interface between the PCRF 350 and the HNB GW 335. The PCRF 350 is connected to the Operator's IP Services 353 via the Rx interface. Examples of operators IP services are IMS and PSS. The PDN Gateway 348 is connected, via the SGi interface, to the Operator's IP services 353.

In this document, location information, e.g. H(e)NB local address info is referring to IPv6 local address, IPv4 local address, or IPv4 local address together with the port number, e.g. the UDP port number (if NAT is detected). The home base station's local IP address may be a public IP address or a private IP address. This IP address together with port allows the PCRF 350 to find a corresponding policy enforcement node in the fixed network. When the home base station 345 is behind a NAT, it will be allocated a private IP address. The PCRF 350 cannot use the private IP address to find out the H(e)NB location. According to the embodiments herein the NAT public IP address plus the UDP port number is transferred to the PCRF 350. The PCRF 350 can use this information to find out the NAT location and enforce the police.

Reporting the Location Information to the Location Information Node

Figure 4:
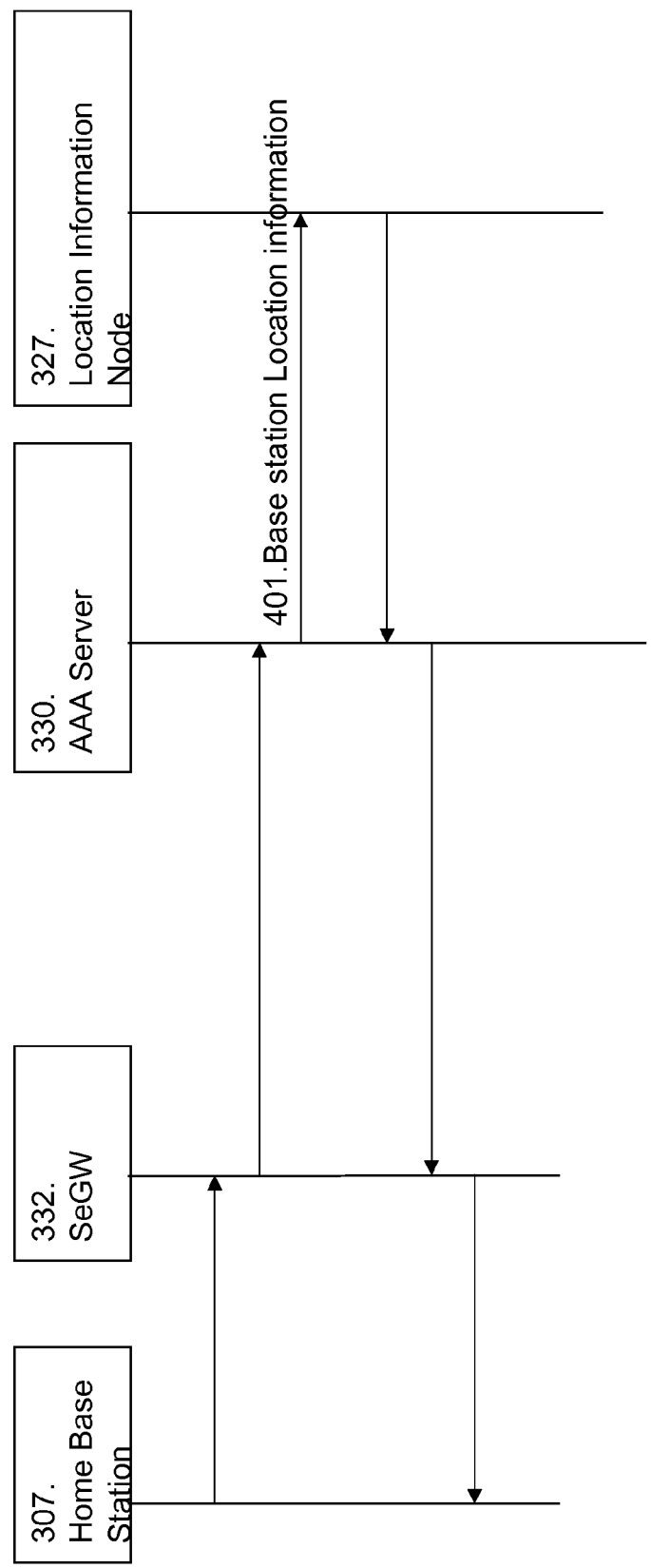
FIG. 4 is a signaling diagram illustrating embodiments of a method for SeGW report of the location information.

As illustrated in FIG. 4, the location information, e.g. the H(e)NB Local address, is reported from the SeGW 332 to the AAA server 330. FIG. 4 also depicts a that the AAA server 330 forwards the location information, e.g. the H(e)NB Local address, to a the location information node 327 which may be a logical function referred to as home base station location Information database. That is, when the home base station 345, e.g. H(e)NB or HeNB, sets up an IPSec tunnel with the SeGW 332, the SeGW 332 shall send the home base station identification, e.g. H(e)NB ID or HNB ID, and its local address information to the AAA server 330. When the location information has changed, e.g. the H(e)NB local address or HeNB local address, for example at NAT remapping, the SeGW 332 also updates the AAA server 330 with the home base station identification, e.g. H(e)NB ID or HeNB ID, and the new/changed location information, e.g. H(e)NB local address or HeNB local address, using the same procedure as described above. In the aforementioned cases, the AAA server 330 forwards the home base station identification, e.g. the H(e)NB ID, and its local address to the location information node 327 which is a new logical node, e.g. a home base station location information database. So the location information node 327 has always updated location information, e.g. H(e)NB local address or HeNB local address, which is associated with the home base station identification, e.g. the H(e)NB ID or HeNB ID, e.g. global H(e)NB ID, global HeNB ID, ECGI, CGI, H(e)NB name (FQDN) or HeNB name.

Providing the Location Information to the PCRF

Figure 7:
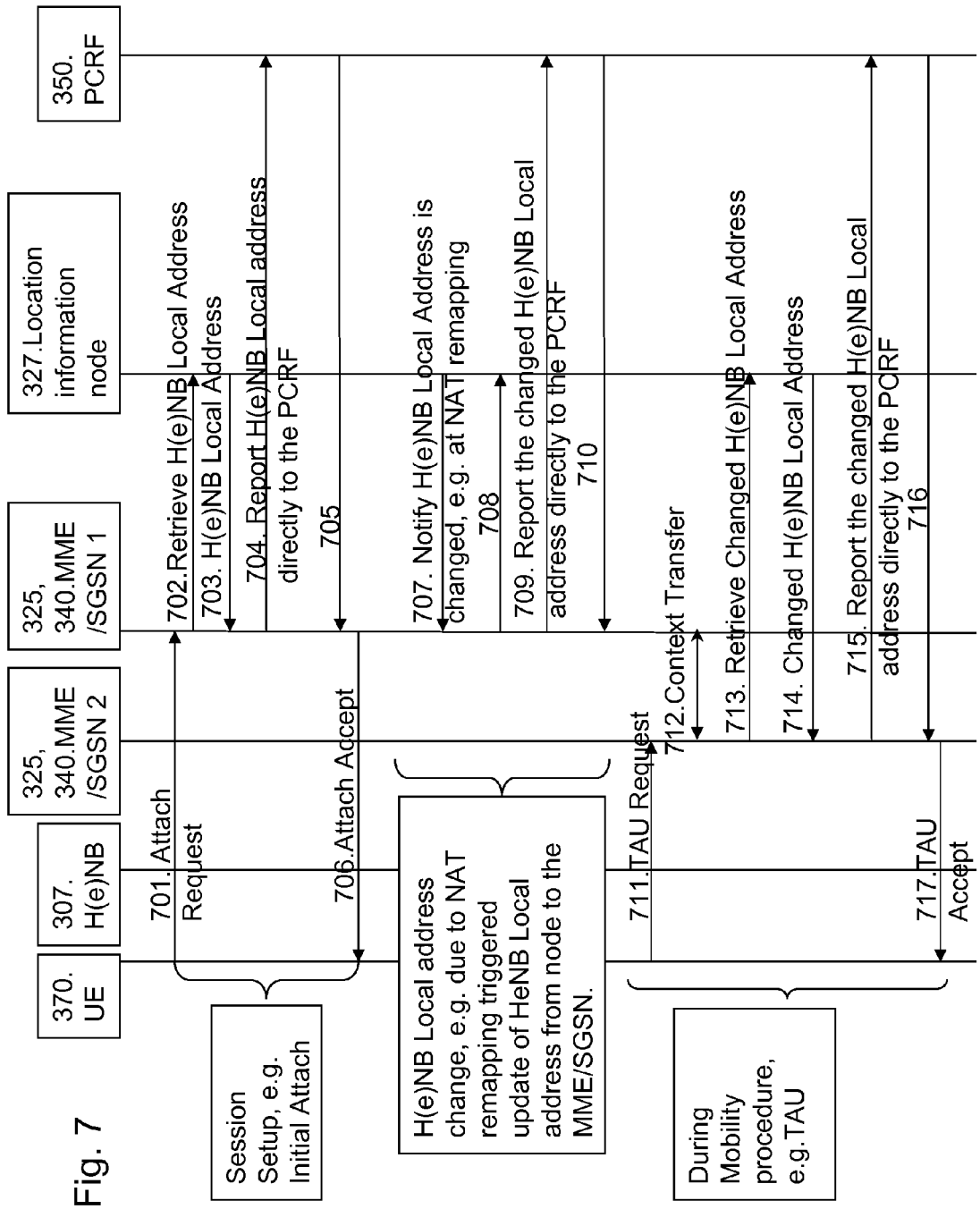
FIG. 7 is a signaling diagram illustrating an embodiment, alternative B, where the location information is reported via a new interface between MME and PCRF
Figure 8:
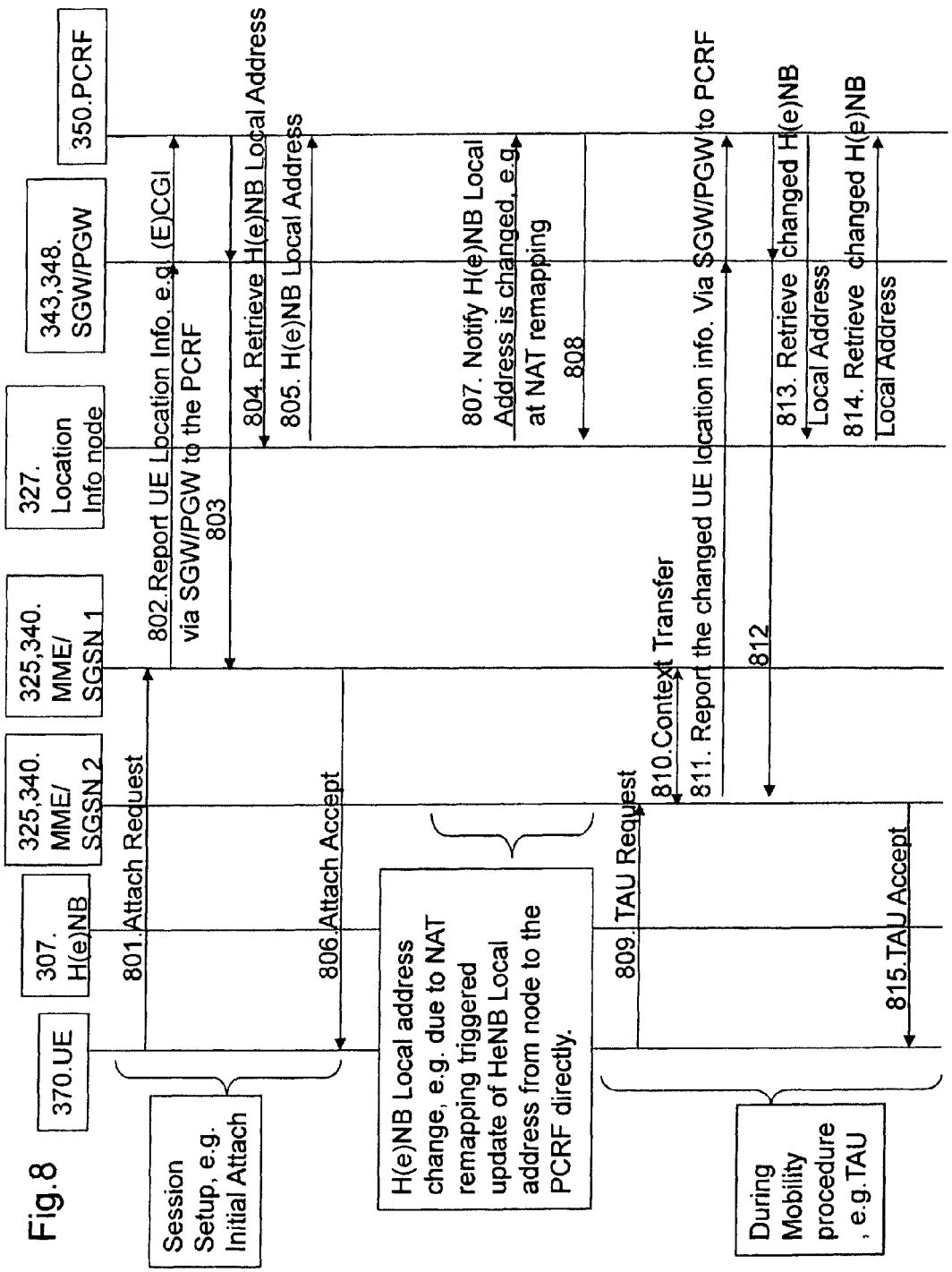
FIG. 8 is a signalling diagram illustrating an embodiment, alternative C, where the location information is reported via a new interface between the location information node and the PCRF.

There are several alternative embodiments for how to provide the location information, e.g. the H(e)NB address or the HNB address, to the PCRF 350. Some of these alternatives will now be described with reference to FIGS. 5a-c, 6, 7 and 8. FIGS. 5a-c provides an overview of three different alternatives. FIGS. 6, 7 and 8 provide more detailed information of each of the three alternatives in FIGS. 5a-c. The messages described in relation to those figures are only shown as examples. The messages sent in the procedure are depending on whether the location information node 327 is a standalone node or included in an existing node.

As mentioned above, FIGS. 5a-c provides an overview of three different alternatives for providing the location information to the PCRF. FIG. 5a illustrates alternative A where the AAA server 330 transmits the location information associated with the home base station 345 to the location information node 327. The location information comprises at least one of a local IP address, a port number and a home base station ID. The location information node 327 transmits the location information to the MME/SGSN 325, 340. The MME/SGSN 325 transmits the location information to the SGW/PGW 343, 348 via the S11/S4 interface based on the GTP protocol and the S5/S8 interface based on the GTP or Proxy Mobile IPv6 (PMIP) protocol. S11 is the interface between the MME 325 and the SGW 343. S4 is the interface between the SGSN 340 and the SGW 343. S5/S8 is the interface between the SGW 343 and the PGW 348. The SGW/PGW 343, 348 transmits the location information to the PCRF 350, via the Gx/Gxx interface. PMIP is a network-based mobility management protocol and is a protocol for building a common and access technology independent of mobile core networks, accommodating various access technologies such as WiMAX, 3GPP, 3GPP2 and WLAN based access architectures.

FIG. 5b illustrates alternative B where the AAA server 330 transmits the location information to the location information node 327. The location information node 327 transmits the location information to the MME/SGSN 325, 340. The MME/SGSN 325, 340 transmits the location information to the PCRF.

FIG. 5c illustrates alternative C where the AAA server 330 transmits the location information to the location information node 327. The location information node 327 transmits the location information directly to the PCRF 350.

In FIGS. 6, 7 and 8 which will be described in detail below, the H(e)NB is used as an example for the home base station 345 and the H(e)NB location information is used as an example of the location information. However, the skilled person will understand that the description is equally applicable to a scenario where the home base station is a HENB and where the location information is the HENB location information.

Alternative A: Via S11/S4, S5/S8 and Gx/Gxx Interface (See FIG. 6)

FIG. 6 illustrates alternative A, where the location information is transmitted to the PCRF 350 via the interfaces S11/S4, S5/S8 and Gx/Gxx. The method comprises the following steps, which steps are performed in any suitable order than described below:

The following steps 601-608 relates to a session setup, e.g. an initial attach or PDP context activation.

Step 601

The UE 370 sends an Attach Request message to the MME/SGSN 1 325. This is in order to perform a UE session setup procedure such as e.g. an E-UTRAN Initial attach procedure or PDP Context activation procedure. The Attach Request message may comprise location information associated with the UE 370, such as e.g. cell ID.

Step 602

At the UE session setup procedure, e.g. E-UTRAN Initial attach procedure or PDP Context activation, the MME/SGSN 325, 340 uses the UE location information (e.g. cell ID) to retrieve the H(e)NB local address from the location information node 327.

The location information node 327 creates an association between the H(e)NB 345 and the MME/SGSN 325, 340 and stores the MME/SGSN ID in a database comprised in a storage or memory unit.

Step 603

The location information node 327 transmits the H(e)NB location address to the MME/SGSN 325, 340.

Step 604

Then the MME/SGSN 325, 340 forwards the H(e)NB local address information to the SGW/PGW 343, 348.

Step 605

The H(e)NB local address information is forwarded from the SGW/PGW 343, 348 to the PCRF 350.

Step 606

The PCRF 350 transmits a response message to the SGW/PGW 343, 348 acknowledging that it has received the H(e)NB local address information.

Step 607

The SGW/PGW 343, 348 forwards the response message to the MME/SGSN 1 325, 340.

Step 608

The MME/SGSN 1 325, 340 transmits an Attach Accept message to the UE 370, which is a response to the request message transmitted in step 601. Thus, the UE 470 knows that the session is setup.

The following steps 609-614 relates to a change of the location information, e.g. due to NAT remapping. The NAT remapping triggers an update of the H(e)NB local address from the location information node 327 to the MME/SGSN 325, 340.

Step 609

When the location information node 327 receives an updated or changed H(e)NB local address, e.g. at NAT remapping, it searches its storage/memory in order to see if there is an MME/SGSN 1 325, 340 associated with the H(e)NB 345 for which the H(e)NB local address has been updated or changed. If an associated MME/SGSN 325, 340 is found in step 609, the location information node 327 shall update the MME/SGSN 325, 340 by transmitting the updated H(e)NB local address info the MME/SGSN 1 325, 340.

Step 610

The MME/SGSN 1 325, 340 transmits a response message to the location information node 327 to acknowledge the receipt of the updated information in step 609.

Step 611

The MME/SGSN 1 325, 340 transmits the updated H(e)NB local address to the SGW/PGW 343, 348 via the S11/S4 and S5/S8 interfaces.

Step 612

The SGW/PGW 343, 348 forwards the updated H(e)NB local address to the PCRF 350 via the Gx/Gxx interfaces.

Step 613

The PCRF 350 transmits a response message to the SGW/PGW 343, 348 to acknowledge the receipt of the updated information in step 612.

Step 614

The SGW/PGW 343, 348 forwards the response message to the MME/SGSN 1 325.

The following steps 615-623 relates to a mobility procedure, e.g. Tracking Area Update (TAU). TAU is a procedure which is initiated by the UE 370 in order to update its registration status with the network. Some reasons for initiating a TAU procedure may be that the UE 370 moves into a new Tracking Area (TA), that some UE specific parameters has changed, it may be periodically performed, it may be because a recovery after an error has been performed etc.

Step 615

The UE 370 transmits a TAU request message to the MME/SGSN 2 325, 340.

Step 616

A context transfer is performed between the MME/SGSN 2 325,340 and the MME/SGSN 1 325, 340. Before the mobility procedure, the UE 370 was served by the MME/SGSN 1. After the mobility procedure, the UE 370 is served by the MME/SGSN 2, Step 617

During mobility procedures, when the MME/SGSN 325, 340 detects that the UE location, e.g. current cell (ECGI/CGI), has been changed, the MME/SGSN 325, 340 will enquiry the location information node 327 to get updated H(e)NB local address.

Step 618

The location information node 327 transmits the updated H(e)NB local address to the enquiring MME/SGSN 2 325, 340.

Step 619

The MME/SGSN 2 325, 340 reports the changed H(e)NB local address to the SGW/PGW 343, 348.

Step 620

The SGW/PGW 343, 348 forwards the changed H(e)NB local address to the PCRF 350.

Step 621

The PCRF 350 transmits a response message to the SGW/PGW 343, 348 to acknowledge the receipt of the updated information in step 620.

Step 622

The SGW/PGW 343, 348 forwards the response message to the MME/SGSN 2.

Step 623

The MME/SGSN 2 transmits a TAU accept message to the UE.

The procedure above is also valid for a scenario where the last UE session associated with the same H(e)NB is released, the MME/SGSN 325, 340 may inform the location information node 327 to remove the association between the home base station 345 and the MME/SGSN 325, 340.

Alternative B: Via New Interface Between MME and PCRF (See FIG. 7)

The difference between alternative B and A, in alternative B, the MME 325 sends the H(e)NB address info directly to the PCRF 350. This is illustrated in FIG. 7. In FIG. 7, the H(e)NB Local address is reported via a new interface between the MME 3325 and the PCRF 350. The benefit of this alternative B, comparing with alternative A, is that the extra signaling over S5/S8 for reporting changed H(e)NB local address is reduced. The method comprises the following steps, which steps may be performed in any suitable order than described below.

The following steps 701-706 relates to a session setup, e.g. an initial attach or PDP context activation.

Step 701

The UE 370 sends an Attach Request message to the MME/SGSN 1 325. This is in order to perform a UE session setup procedure such as e.g. an E-UTRAN Initial attach procedure or PDP Context activation procedure. The Attach Request message may comprise location information associated with the UE 370, such as e.g. cell ID.

Step 702

At the UE session setup procedure, e.g. E-UTRAN Initial attach procedure or PDP Context activation, the MME/SGSN 325, 340 uses the UE location information (e.g. cell ID) to retrieve the H(e)NB local address from the location information node 327. The location information node 327 creates an association between the H(e)NB 345 and the MME/SGSN 325, 340 and stores the MME/SGSN ID in a database comprised in a storage or memory unit.

Step 703

The location information node 327 transmits the H(e)NB location address back to the MME/SGSN 325, 340.

Step 704

Then the MME/SGSN 325, 340 transmits the H(e)NB local address information directly to the PCRF 350.

Step 705

The PCRF 350 transmits a response message to the MME/SGSN_ 1 325, 340 acknowledging that it has received the H(e)NB local address information.

Step 706

The MME/SGSN 1 325, 340 transmits an Attach Accept message to the UE 370, which is a response to the request message transmitted in step 701. Thus, the UE 370 knows that the session is setup.

The following steps 707-710 relates to a change of the location information, e.g. due to NAT remapping. The NAT remapping triggers an update of the H(e)NB local address from the location information node 327 to the MME/SGSN 325, 340.

Step 707

When the location information node 327 receives an updated or changed H(e)NB local address, e.g. at NAT remapping, it searches its storage/memory in order to see if there is an MME/SGSN 1 325, 340 associated with the H(e)NB 345 for which the H(e)NB local address has been updated or changed. If an associated MME/SGSN 325, 340 is found, the location information node 327 shall update the MME/SGSN 1 325, 340 by transmitting the updated H(e)NB local address info the MME/SGSN 1 325, 340.

Step 708

The MME/SGSN 1 325, 340 transmits a response message to the location information node 327 to acknowledge the receipt of the updated information in step 707.

Step 709

The MME/SGSN 1 325, 340 transmits the updated H(e)NB local address directly to the PCRF 350.

Step 710

The PCRF 350 transmits a response message to the MME/SGSN 1 325, 340 to acknowledge the receipt of the updated information in step 709.

The following steps 711-717 relates to a mobility procedure, e.g. Tracking Area Update (TAU). TAU is a procedure which is initiated by the UE 370 in order to update its registration status with the network. Some reasons for initiating a TAU procedure may be that the UE 370 moves into a new Tracking Area (TA), that some UE specific parameters has changed, it may be periodically performed, it may be because a recovery after an error has been performed etc.

Step 711

The UE 370 transmits a TAU request message to the MME/SGSN 2 325, 340.

Step 712

A context transfer is performed between the MME/SGSN 2 325,340 and the MME/SGSN 1 325, 340. Before the mobility procedure, the UE 370 was served by the MME/SGSN 1. After the mobility procedure, the UE 370 is served by the MME/SGSN 2, Step 713

During mobility procedures, when the MME/SGSN 325, 340 detects that the UE location, e.g. current cell (ECGI/CGI), has been changed, the MME/SGSN 325, 340 will enquiry the location information node 327 to get updated H(e)NB local address.

Step 714

The location information node 327 transmits the updated H(e)NB local address to the enquiring MME/SGSN 2 325, 340.

Step 715

The MME/SGSN 2 325, 340 reports the changed H(e)NB local address to the PCRF 350.

Step 716

The PCRF 350 transmits a response message to the MME/SGSN 2 325, 340 to acknowledge the receipt of the updated information in step 715.

Step 717

The MME/SGSN 2 325, 340 transmits a TAU accept message to the UE.

Alternative C: A New Interface Between the Location Information Node and the PCRF (See FIG. 8)

FIG. 8 illustrates alternative C where, at UE session setup, e.g. E-UTRAN initial attach, PDP Context activation, the UE location info is sent directly to the PCRF 350 at IP-CAN session setup procedure. The method comprises the following steps, which steps are performed in any suitable order than described below:

The following steps 801-806 relates to a session setup, e.g. an initial attach or PDP context activation.

Step 801

The UE 370 sends an Attach Request message to the MME/SGSN 1 325. This is in order to perform a UE session setup procedure such as e.g. an E-UTRAN Initial attach procedure or PDP Context activation procedure. The Attach Request message may comprise location information associated with the UE 370, such as e.g. cell ID.

Step 802

The MME/SGSN 1 325, 340 reports the UE location information associated with the UE 370 via the SGW/PGW 343, 348 to the PCR 350. The UE location information may be for example the (E)CGI, cell ID.

Step 803

The PCRF 350 transmits a response back to the MME/SGSN 1 325, 340, via the SGW/PGW 343, 348 to confirm that the UE location information was received I step 802.

Step 804

The PCRF 350 uses the received UE location information (e.g. E(CGI), cell ID) to retrieve the H(e)NB local address from the location information node 327, e.g. the H(e)NB location database, via a new interface.

Step 805

The location information node 327 reces the request for H(e)NB local address from the PCRF 350, creates an association between the H(e)NB 345 and the PCRF 350 and stores the PCRF ID in the database in its memory. The location information node 327 transmits the H(e)NB local address to the PCRF 350.

Step 806

The MME/SGSN 1 325, 340 transmits an Attach Accept message to the UE 370, which is a response to the request message transmitted in step 701. Thus, the UE 370 knows that the session is setup.

The following steps 807-808 relates to a change of the location information, e.g. due to NAT remapping. The NAT remapping triggers an update of the H(e)NB local address from the location information node 327 to the MME/SGSN 325, 340.

Step 807

When the location information node 327 receives an updated or changed H(e)NB local address, e.g. at NAT remapping, it searches its storage for an associated PCRF 350. If an associated PCRF 350 is found, the location information node 327 updates the PCRF 350 with the updated H(e)NB local address information.

Step 808

The PCRF 350 transmits a response message to the location information node 327 to acknowledge the receipt of the updated information in step 807.

If the last IP-CAN session associated with the same H(e)NB the PCRF 350 may inform the location information node 327 to remove the association between the H(e)NB 345 and the PCRF 350.

The following steps 809-815 relates to a mobility procedure, e.g. Tracking Area Update (TAU).

Step 809

The UE 370 transmits a TAU request message to the MME/SGSN 2 325, 340.

Step 810

A context transfer is performed between the MME/SGSN 2 325,340 and the MME/SGSN 1 325, 340. Before the mobility procedure, the UE 370 was served by the MME/SGSN 1. After the mobility procedure, the UE 370 is served by the MME/SGSN 2 325, 340.

Step 811

During mobility procedures, e.g. a TAU procedure, the MME/SGSN 2 325, 340 reports the changed UE location information, e.g. ECGI/CGI change, to the PCRF 350 via the SGW/PGW 343, 348 when for example the UE 370 moves from one H(e)NB to another H(e)NB. The MME/SGSN 2 325, 340 also indicates to the PCRF 350 if the UE 370 is accessed from the H(e)NB.

The ECGI mentioned above is an abbreviation for E-UTRAN Cell Global Identifier and it is used to identify cells globally. The ECGI is constructed from the PLMN identity the cell belongs to and the Cell Identity (CI) of the cell. The comprised PLMN is the one given by the first PLMN entry in SIB1. The eNB Identifier (eNB ID) is used to identify eNBs within a PLMN. The eNB ID is comprised within the CI of its cells. The Global eNB ID is used to identify eNBs globally. The Global eNB ID is constructed from the PLMN identity the eNB belongs to and the eNB ID. The MCC and MNC are the same as comprised in the E-UTRAN Cell Global Identifier (ECGI). The Global eNB ID of RN is the same as its serving DeNB. The Tracking Area identity (TAI) is used to identify tracking areas. The TAI is constructed from the PLMN identity the tracking area belongs to and the TAC (Tracking Area Code) of the Tracking Area. The CSG identity (CSG ID) is used to identify a CSG within a PLMN.

Step 812

The PCRF 350 sends a response message to the MME/SGSN 2 325, 340 in order to acknowledge the receipt of the changed information in step 811.

Step 813

During mobility procedures, e.g. a TAU procedure, when the PCRF 350 detects that the UE location, e.g. that the current cell information (ECGI/CGI), has been changed, the PCRF 350 will enquiry the location information node 327 to get the corresponding H(e)NB local address.

Step 814

The location information node 327 transmits the corresponding H(e)NB local address to the PCRF 350.

Step 815

The MME/SGSN 2 325, 340 transmits a TAU accept message to the UE 370.

Figure 9:
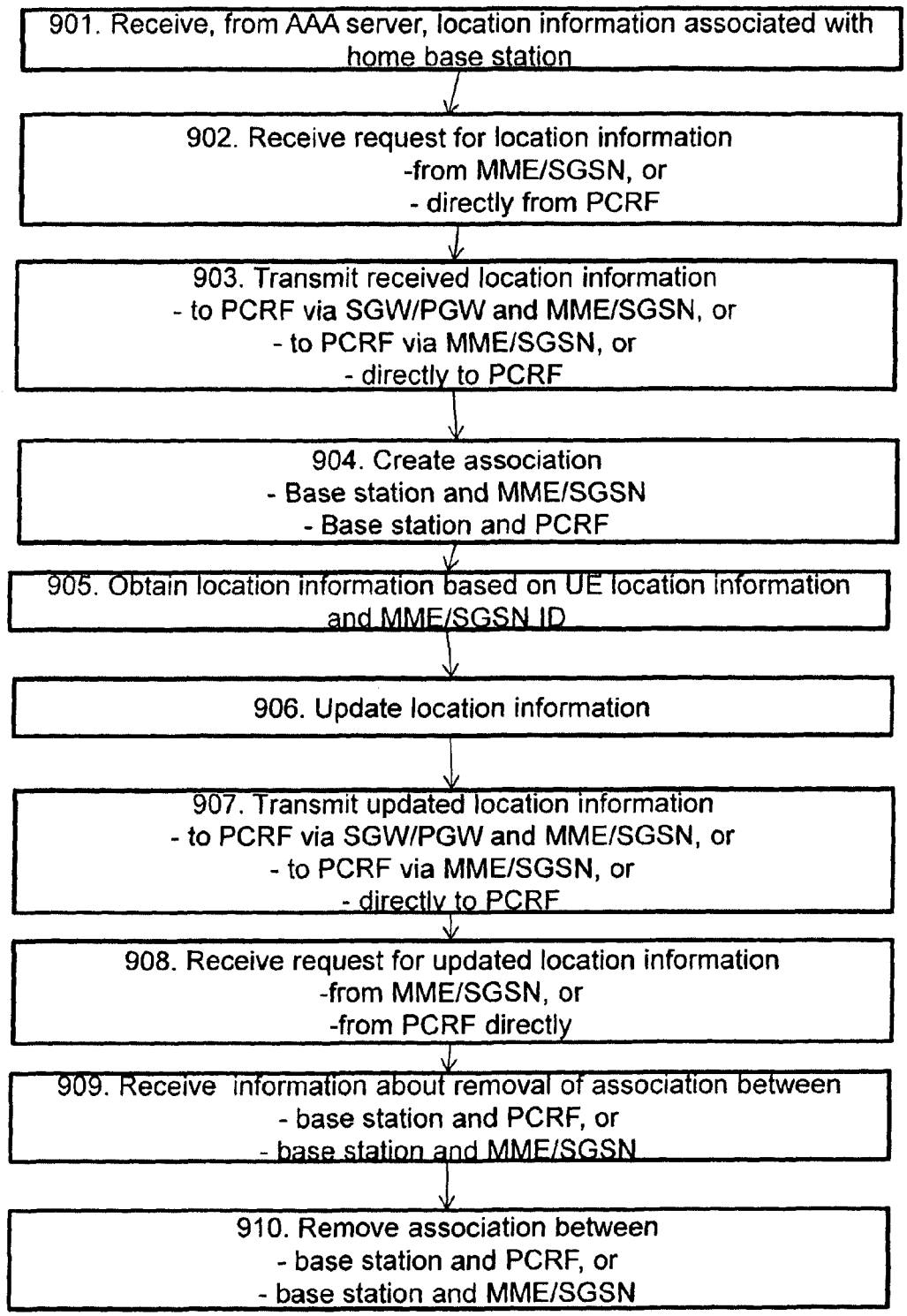
FIG. 9 is a flow chart illustrating embodiments of a method in the location information node.

The method described above will now be described seen from the perspective of location information node 327. FIG. 9 is a flowchart describing the method in the location information node 327, for providing location information associated with a home base station 345 to the PCRF 350. The location information node 327 is dedicated to handling the location information when the user equipment 370 attaches to the communications network 300 via a home base station 345. The location information node 327 is connected to an AAA server 330 and a MME/SGSN 325, 340. The home base station 345 may be a home evolved Node B (HeNB) or a Home Node B (HNB). In some embodiments, the location information node 327 is a standalone node or the location information node 327 is co-located with a HSS 326, an AAA server 330, SeGW or the PCRF 350. The method comprises the further steps to be performed by location information node 327:

Step 901

This step corresponds to step 401 in FIG. 4. The location information node 327 receives the location information associated with the home base station 345 from the AAA server 330.

The location information may be received from the AAA server 330 when the home base station 345 sets up an IPSec tunnel with the SeGW 332.

The location information may comprise at least one of a local Internet Protocol, IP, address and a port number associated with and identify of the home base station 345. The local IP address may be an IPv6 address or an IPv4 address and wherein the port number is a UDP port number. The location information may comprise a port number associated with the home base station 345 when a Network Address Translator, NAT is detected.

In some embodiments, the location information comprises a home base station identification. In some embodiments, the home base station identification is a global base station ID, an ECGI, a CGI, a home base station name or a FQDN.

Step 902

This step corresponds to step 602 in FIG. 6, step 702 in FIG. 7 and step 804 in FIG. 8. In some embodiments, the location information node 327 receives a request for the location information from a MME/SGSN 325, 340. The request comprises a UE location information and a MME/SGSN ID. The UE 370 is served by the home base station 345.

In some embodiments, the location information node 327 receives the request for the location information directly from the PCRF 350. The request comprises a User Equipment, UE, location information and a PCRF ID. The UE 370 is served by the home base station 345.

Step 903

This step corresponds to steps 603, 604 and 605 in FIG. 6, steps 703 and 704 in FIG. 7 and step 805 in FIG. 8. The location information node 327 transmits the location information to the PCRF 350.

In some embodiments, the location information is transmitted to the PCRF 350 via the MME/SGSN 325, 340 using an interface between the MME/SGSN 325, 340 and the PCRF 350.

In some embodiments, the location information is transmitted to the PCRF 350 via the MME/SGSN 325, 340 and the SGW/PGW 343, 348 using a S11/S4 interface, a S5/S8 interface and a Gx/Gxx interface.

In some embodiments, the location information is transmitted directly to the PCRF 350 using an interface between the location information node 327 and the PCRF 350.

Step 904

In some embodiments, the location information node 327 creates an association between the home base station 345 and the MME/SGSN 325, 340, from which the request was received, or it creates an association between the home base station 345 and the PCRF 350 from which the request was received. This depends on which of the alternatives that are performed in step 902.

The MME/SGSN 325,340 does not have any H(e)NB IPSec tunnel information. But the MME/SGSN has the H(e)NB cell ID and the SeGW 332 has the H(e)NB IP address and H(e)NB ID. The MME/SGSN 325, 340 has to use the H(e)NB ID to map to the cell ID and retrieve the H(e)NB NAT IP address from the new interface. So the "association" is referring to the mapping function.

Step 905

In some embodiments, the location information node 327 obtains the location information based on the UE location information and the MME/SGSN ID, or based on the UE location information and the PCRF ID.

Step 906

In some embodiments, the location information node 327 updates the received location information.

Step 907

This step corresponds to steps 609, 610, 611, 612, 618, 619 and 620 in FIG. 6, steps 707, 708, 709, 714 and 715 in FIG. 7 and steps 807 and 814 in FIG. 8. In some embodiments, the location information node 327 transmits the updated location information to the PCRF 350.

In some embodiments, the updated location information is transmitted to the PCRF 350 via the MME/SGSN 325, 340 when location information node 327 has created an associated between the home base station 345 and the MME/SGSN 325, 340.

In some embodiments, the updated location information is transmitted to the PCRF 350 via the MME/SGSN 325, 340 and a SGW/PGW 343, 348 when location information node 327 has created an associated between the home base station 345 and the MME/SGSN 325, 340.

In some embodiments, the updated location information is transmitted directly to the PCRF 350 when location information node 327 has created an associated between the home base station 345 and the PCRF 350.

Step 908

This step corresponds to step 617 in FIG. 6, step 713 in FIG. 7 and step 813 in FIG. 8. In some embodiments, the location information node 327 receives a request for the updated location information.

In some embodiments, the request for updated location information is received from the MME/SGSN 325, 340 or from the PCRF 350.

Step 909

In some embodiments, the location information node 327 receives information about removal of the association between the home base station 345 and the MME/SGSN 325, 340, or the association between the home base station 345 and the PCRF 350.

Step 910

This step is performed after step 909. In some embodiments, the location information node 327 removes the associated between the home base station 345 and the MME/SGSN 325, 340 or the associated between the home base station 345 and the PCRF 350.

Figure 10:
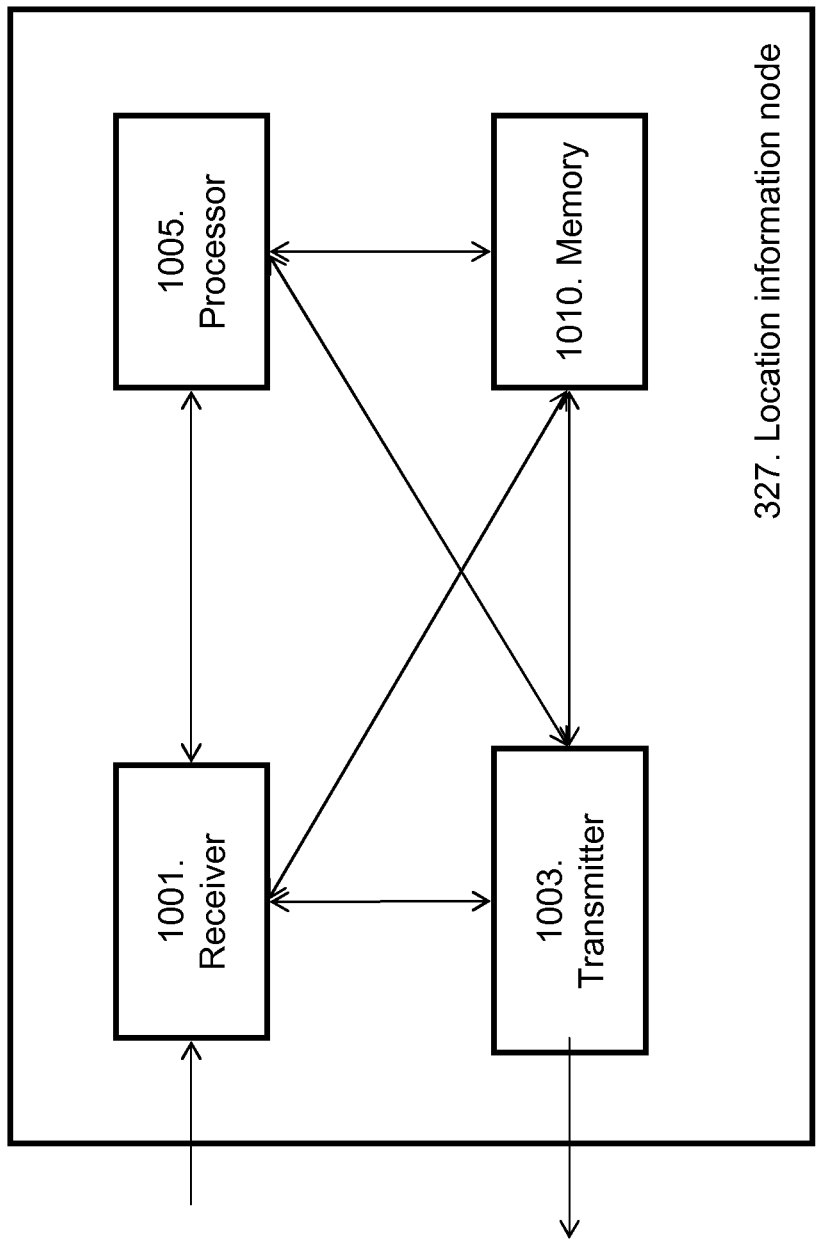
FIG. 10 is a schematic block diagram illustrating embodiments of a location information node.

To perform the method steps shown in FIG. 8 providing location information associated with a home base station 345 to the PCRF 350, the location information node 327 comprises an arrangement as shown in FIG. 10. The location information node 327 is adapted to be dedicated to handling the location information when the user equipment 370 attaches to the communications network 300 via a home base station 345. The location information node 327 is adapted to be connected to an AAA server 330 and a MME/SGSN 325. In some embodiments, the location information comprises at least one of a local IP address, and a port number associated with the home base station 345. In some embodiments, the local IP address is an IPv6 address or an IPv4 address and the port number is a UDP port number. The location information may comprise a home base station identification. The home base station identification may be a global base station ID, an ECGI, a CGI, a home base station name or a FQDN. In some embodiments, the location information node 327 is a standalone node or wherein the location information node 327 is co-located with a HSS 326, an AAA server 330, a SeGW or the PCRF 350. The home base station 345 may be a HeNB or a HNB.

The location information node 327 comprises a receiver 1001 configured to receive, from the AAA server 330, the location information associated with the home base station 345. The location information comprises at least one of a local IP address and a port number associated with an identity of the home base station 345. The receiver 1001 may be is further configured to receive a request for the location information from a MME/SGSN 325, 340. The request comprises a U, location information and a MME/SGSN ID. The UE 370 is served by the home base station 345. In some embodiments, the receiver 1001 is further configured to receive information about removal of the association between the home base station 345 and the MME/SGSN 325, 340. In some embodiments, the receiver 1001 is further configured to receive a request for the location information directly from the PCRF 350, which request comprises a UE location information and a PCRF ID. The UE 370 is served by the home base station 345. In some embodiments, the receiver 1001 is further configured to receive information about removal of the association between the home base station 345 and the PCRF 350. In some embodiments, the receiver 1001 is further configured to receive a request for the updated location information. In some embodiments, the receiver 1001 is further configured to receive the request from the MME/SGSN 325, 340 or from the PCRF 350. In some embodiments, the receiver 1001 is further configured to receive the location information from an AAA server 330 when the home base station 345 sets up an IPSec tunnel with a SeGW 332.

The location information node 327 comprises a transmitter 1003 which is configured to transmit the location information to the PCRF 350. In some embodiments, the transmitter 1003 is configured to transmit the location information to the PCRF 350 via the MME/SGSN 325, 340 using an interface between the MME/SGSN 325, 340 and the PCRF 350. In some embodiments, the transmitter 1003 is configured to transmit the location information to the PCRF 350 via the MME/SGSN 325, 340 and a SGW/PGW 343, 348 using a S11/S4 interface, a S5/S8 interface and a Gx/Gxx interface. In some embodiments, the transmitter 1003 is further configured to transmit the location information directly to the PCRF 350 using an interface between the location information node 327 and the PCRF 350. In some embodiments, the transmitter 1003 is further configured to transmit the updated location information to the PCRF 350. In some embodiments, the transmitter 1003 is further configured to transmit the updated location information to the PCRF 350 via the MME/SGSN 325, 340 when location information node 327 has created an associated between the home base station 345 and the MME/SGSN 325, 340. In some embodiments, the transmitter 1003 is further configured to transmit the updated location information to the PCRF 350 via the MME/SGSN 325, 340 and a SGW/PGW 343, 348 when location information node 327 has created an associated between the home base station 345 and the MME/SGSN 325, 340. In some embodiments, the transmitter 1003 is further configured to transmit the updated location information directly to the PCRF 350 when location information node 327 has created an associated between the home base station 345 and the PCRF 350.

In some embodiments, the location information node 327 further comprises a processor 1005 configured to create an association between the home base station 345 and the MME/SGSN 325, 340 from which the request was received. In some embodiments, the processor 1005 is configured to obtain location information based on the UE location information and the MME/SGSN ID. In some embodiments, the processor 1005 is further configured to remove the associated between the home base station 345 and the MME/SGSN 325, 340. In some embodiments the processor 1005 is further configured to create an association between the home base station 345 and the PCRF 350 and to obtain the location information based on the UE location information and the PCRF ID. In some embodiments, the processor 1005 is further configured to remove the associated between the home base station 345 and the PCRF 350. In some embodiments, the processor 705 is further configured to update the location information. In some embodiments, the processor 1005 configured to detect a NAT. The location information may comprise a port number associated with the home base station 345 when the NAT is detected.

The present mechanism for providing location information associated with a home base station 345 to the PCRF 350 may be implemented through one or more processors, such as a processor 1005 in the node arrangement depicted in FIG. 10 together with computer program code for performing the functions of the embodiments herein. The processor 1005 may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the location information node 327. One such carrier may be in the form of a CD ROM disc. It is however feasible with other data carriers such as a memory stick. The computer program code may furthermore be provided as pure program code on a server and downloaded to the location information node 327.

The location information node 327 may further comprise a memory 1010 comprising one or more memory units. The memory 1010 is arranged to be used to store data, received data streams, home base station location information, UE location information, MME/SGSN ID, PCRF ID, updated home base station location information, history about changes to the home base station location information, information about associations between home base station and PCRF and between home base station and MME/SGSN, requests for information, IP addresses, UDP port numbers, threshold values, time periods, configurations, scheduling's, and applications to perform the methods herein when being executed in the location information node 327.

Those skilled in the art will also appreciate that the receiver 1001 and the transmitter 1003 described above may refer to a combination of analog and digital circuits, and/or one or more processors configured with software and/or firmware, e.g. stored in a memory 1010, that when executed by the one or more processors such as the processor 1005 perform as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended embodiments may, without departing from the embodiments herein, be performed in another order than the order in which they appear.

Those skilled in the art will understand that the different options may be directly predicted and obtained from the examples that have been shown in the description.

The invention claimed is:

1. A method in a location information node for providing location information associated with a home base station to a Policy and Charging Rules Function, PCRF, wherein the location information node is dedicated to handling the location information, and wherein the location information node is connected to an Authentication, Authorization and Accounting, AAA, server and a Mobility Management Entity/Serving General packet radio service Support Node, MME/SGSN, the method comprising:

when the home base station sets up an Internet Protocol Security, IPSec tunnel with a Security GateWay, SeGW, receiving the location information from the AAA server, wherein the location information comprises at least one of a local Internet Protocol, IP, address, and a port number associated with an identity of the home base station; and transmitting the location information directly to the PCRF via the MME/SGSN using an interface between the MME/SGSN and the PCRF.

2. The method according to claim 1, further comprising:
receiving a request for the location information from the MME/SGSN, which request comprises a User Equipment, UE, location information and a MME/SGSN ID, and which UE is served by the home base station;
creating an association between the home base station and the MME/SGSN from which the request was received; and
obtaining the location information based on the UE location information and the MME/SGSN ID.

3. The method according to claim 2, further comprising:
receiving information about removal of the association between the home base station and the MME/SGSN; and
removing the association between the home base station and the MME/SGSN.

4. The method according to claim 1, further comprising:
receiving a request for the location information directly from the PCRF, which request comprises a User Equipment, UE, location information and a PCRF ID, which UE is served by the home base station;
creating an association between the home base station and the PCRF from which the request was received; and
obtaining the location information based on the UE location information and the PCRF ID.

5. The method according to claim 4, further comprising:
receiving information about removal of the association between the home base station and the PCRF; and
removing the association between the home base station and the PCRF.

6. The method according to claim 1, further comprising:
updating the received location information; and
transmitting the updated location information to the PCRF, wherein the updated location information is transmitted to the PCRF via the MME/SGSN when the location information node has created an associated between the home base station and the MME/SGSN, wherein the updated location information is transmitted to the PCRF via the MME/SGSN and a SGW/PGW when the location information node has created an association between the home base station and the MME/SGSN, and wherein the updated location information is transmitted directly to the PCRF when the location information node has created an association between the home base station and the PCRF.

7. The method according to claim 1, further comprising:
receiving a request for the updated location information from the MME/SGSN or from the PCRF.

8. The method according to claim 1, wherein the location information comprises a port number associated with the home base station when a Network Address Translator, NAT is detected.

9. The method according to claim 1, wherein the location information node is a standalone node or wherein the location information node is co-located with or at least a part of a Home Subscriber Server, HSS, the AAA server, a SeGW or the PCRF.

10. A location information node for providing location information associated with a home base station to a Policy and Charging Rules Function, PCRF, wherein the location information node is adapted to be dedicated to handling the location information, and wherein the location information node is adapted to be connected to an Authentication, Authorization and Accounting, AAA, server and a Mobility Management Entity/Serving General packet radio service Support Node, MME/SGSN, the location information node comprising:
- a receiver configured to receive, from the AAA server, the location information associated with the home base station when the home base station sets up an Internet Protocol Security, IPSec tunnel with a Security GateWay, SeGW, wherein the location information comprises at least one of a local Internet Protocol, IP, address, and a port number associated with an identity of the home base station; and
- a transmitter configured to transmit the location information directly to the PCRF via the MME/SGSN using an interface between the MME/SGSN and the PCRF.

11. The location information node according to claim 10, wherein the receiver is further configured to receive a request for the location information from the MME/SGSN, wherein the request comprises a User Equipment, UE, location information and a MME/SGSN ID, wherein the UE is served by the home base station; and wherein the location information node further comprises:
- a processor configured to:
  create an association between the home base station and the MME/SGSN from which the request was received; and
obtain the location information based on the UE location information and the MME/SGSN ID.

12. The location information node according to claim 11, wherein the receiver is further configured to receive information about removal of the association between the home base station and the MME/SGSN; and wherein the processor is further configured to remove the association between the home base station and the MME/SGSN.

13. The location information node according to claim 12, wherein the receiver is further configured to receive a request for the location information associated with the home base station directly from the PCRF, wherein the request comprises a User Equipment, UE, location information and a PCRF ID, wherein the UE is served by the home base station;
and wherein the processor is further configured to:
  create an association between the home base station and the PCRF; and
  obtain the location information based on the UE location information and the PCRF ID.

14. The location information node according to claim 13, wherein the receiver is further configured to receive information about removal of the association between the home base station and the PCRF; and wherein the processor is further configured to remove the association between the home base station and the PCRF.

15. The location information node according to claim 10, further comprising:
- a processor configured to update the location information; and wherein the transmitter is further configured to transmit the updated location information to the PCRF wherein the transmitter is further configured to transmit the updated location information to the PCRF via the MME/SGSN when the node has created an association between the home base station (345) and the MME/SGSN,
- wherein the transmitter is further configured to transmit the updated location information to the PCRF via the MME/SGSN and a Serving GateWay/Packet data network GateWay, SGW/PGW, when the node has created an association between the home base station and the MME/SGSN, and
- wherein the transmitter is further configured to transmit the updated location information directly to the PCRF when node has created an association between the home base station and the PCRF.

16. The location information node according to claim 15, wherein the receiver is further configured to receive a request for the updated location information from the MME/SGSN or from the PCRF.

17. The location information node according to claim 10, further comprising:
- a processor configured to detect a Network Address Translator, NAT; and wherein the location information comprises a port number associated with the home base station when the NAT is detected.

18. The location information node according to claim 10, wherein the node is a standalone node or wherein the node is co-located with or at least a part of a Home Subscriber Server, HSS, the AAA server, the SeGW, or the PCRF.

* * * * *